Jan. 22, 1963     D. M. WILLYOUNG ET AL     3,075,104
LIQUID-COOLED ROTOR FOR A DYNAMOELECTRIC MACHINE
Filed April 28, 1960     7 Sheets-Sheet 2

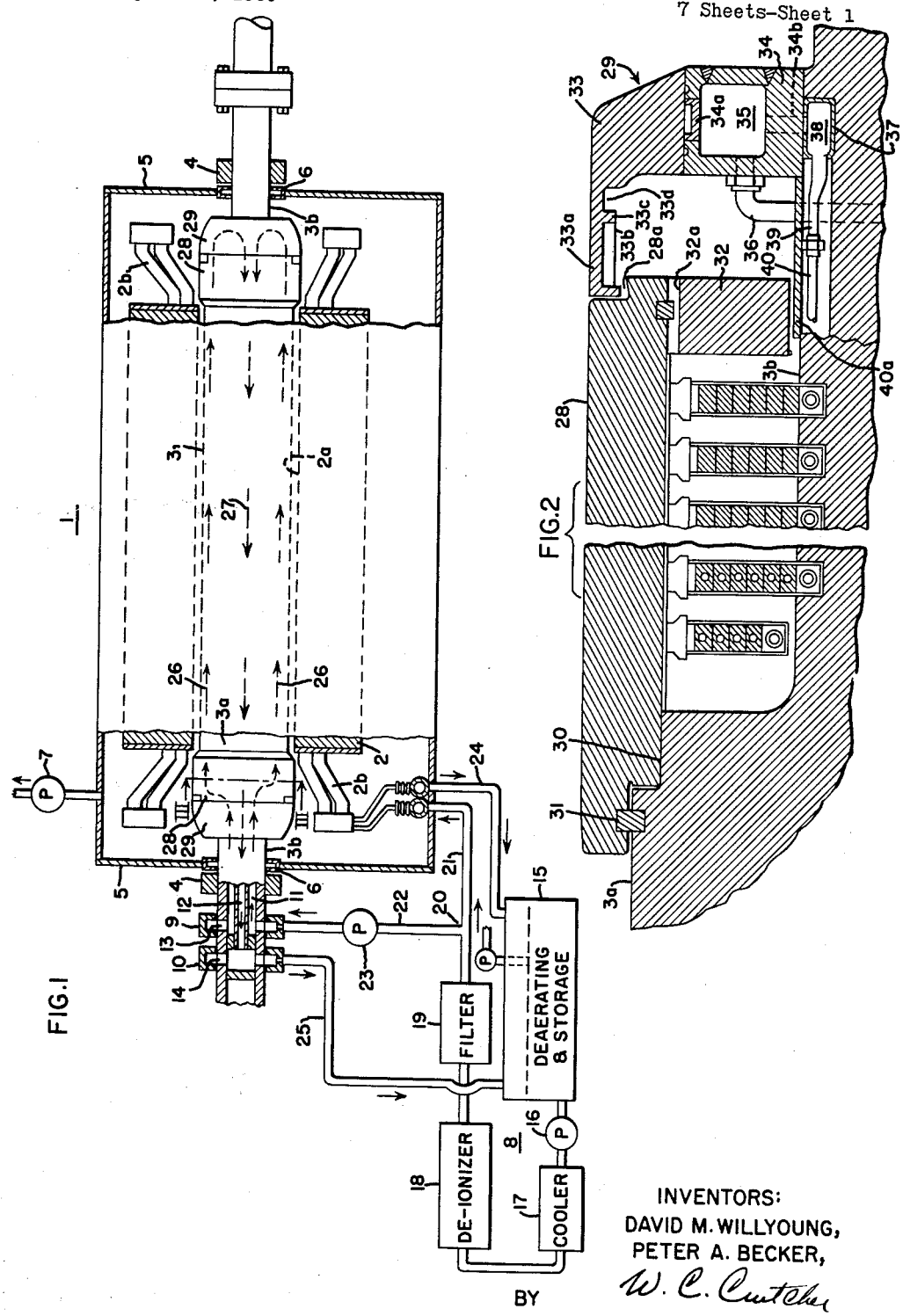
Jan. 22, 1963  D. M. WILLYOUNG ET AL  3,075,104
LIQUID-COOLED ROTOR FOR A DYNAMOELECTRIC MACHINE
Filed April 28, 1960  7 Sheets-Sheet 1
INVENTORS:
DAVID M. WILLYOUNG,
PETER A. BECKER,
BY W. C. Cutcher
THEIR ATTORNEY.

INVENTORS:
DAVID M. WILLYOUNG,
PETER A. BECKER,

BY    *W. C. Crutcher*

THEIR ATTORNEY

Jan. 22, 1963    D. M. WILLYOUNG ET AL    3,075,104
LIQUID-COOLED ROTOR FOR A DYNAMOELECTRIC MACHINE
Filed April 28, 1960    7 Sheets-Sheet 3
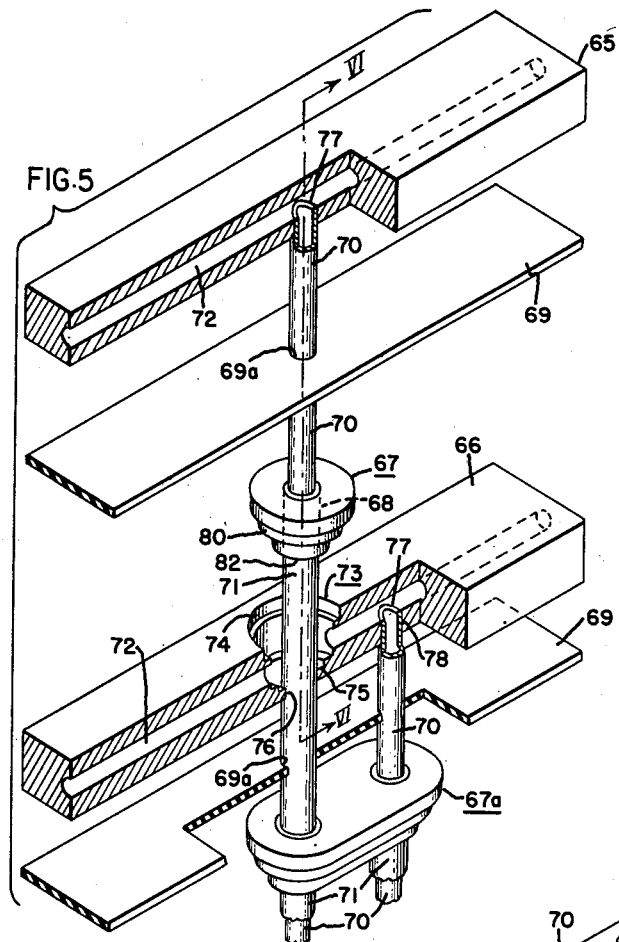
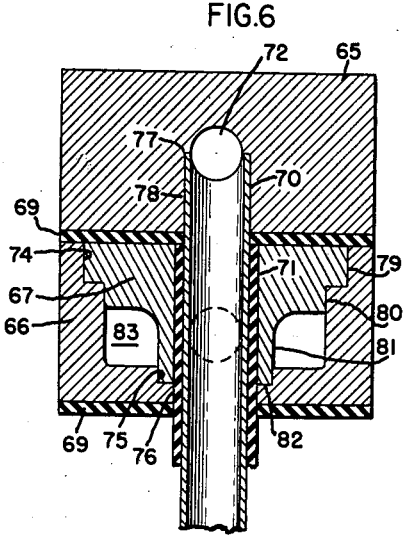
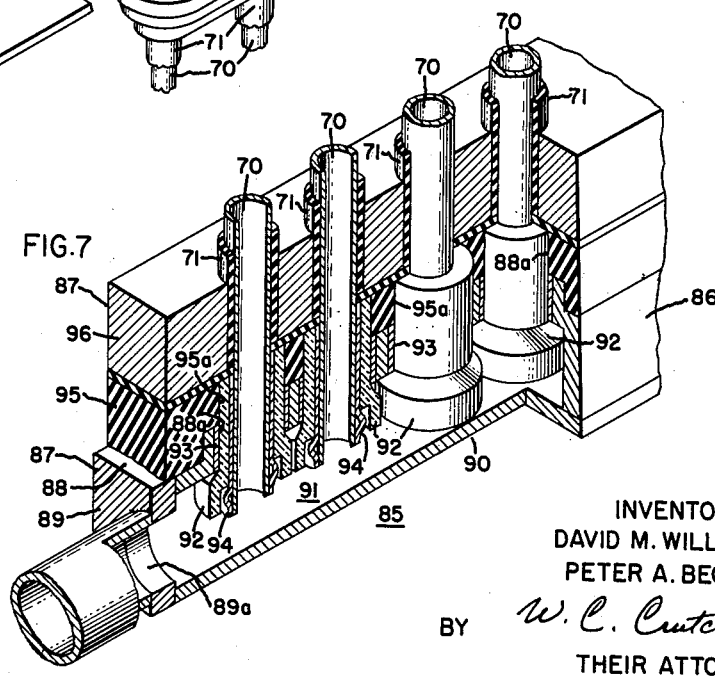
INVENTORS:
DAVID M. WILLYOUNG,
PETER A. BECKER,
BY W. C. Crutcher
THEIR ATTORNEY.

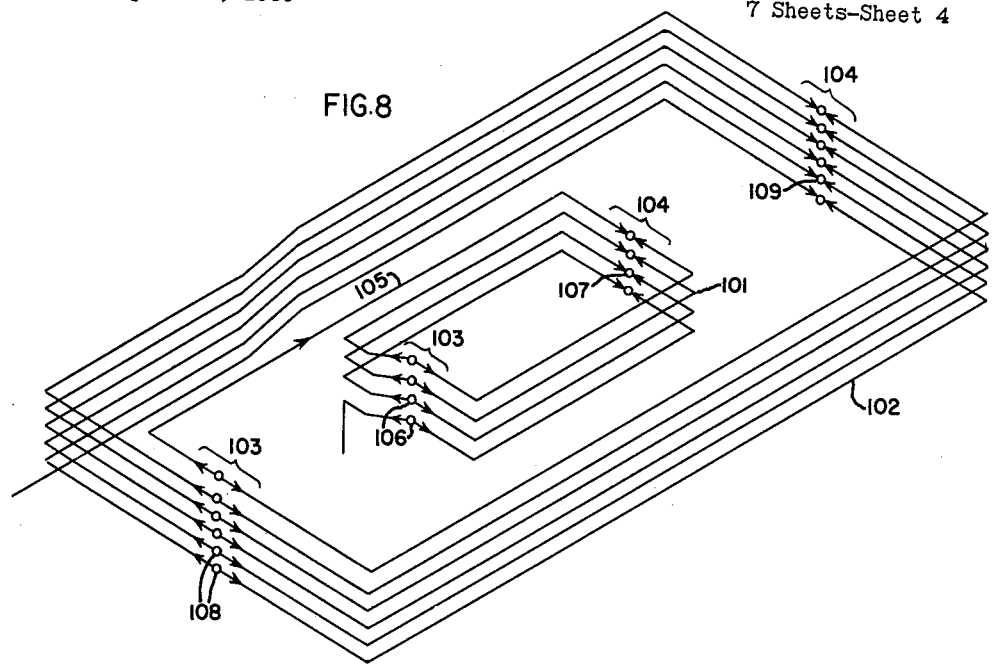
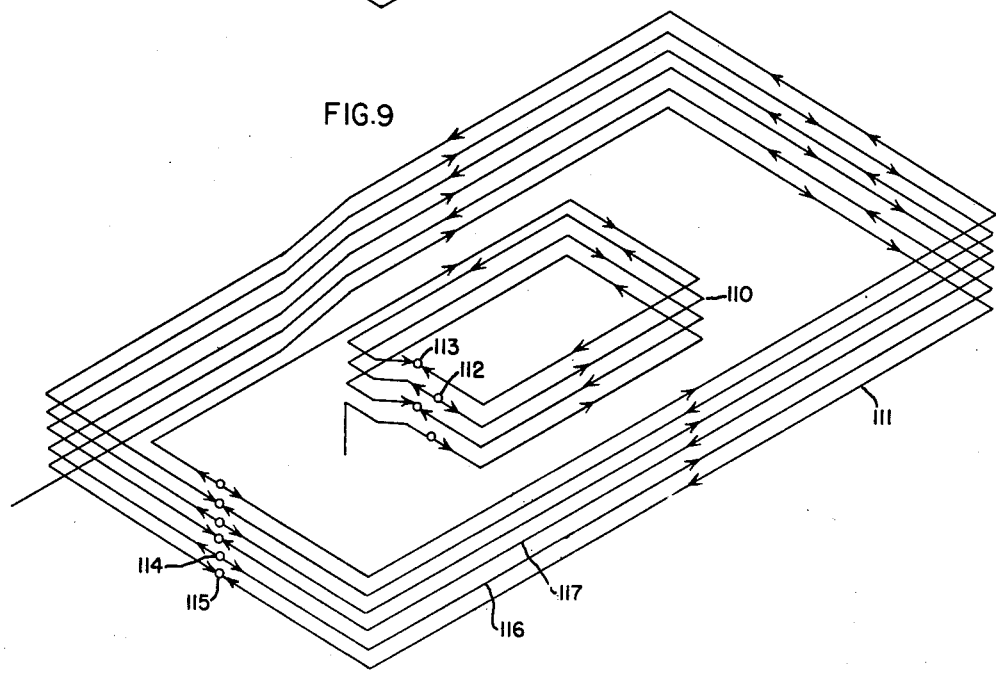

INVENTORS:
DAVID M. WILLYOUNG,
PAUL A. BECKER,

BY W. C. Crutcher

THEIR ATTORNEY.

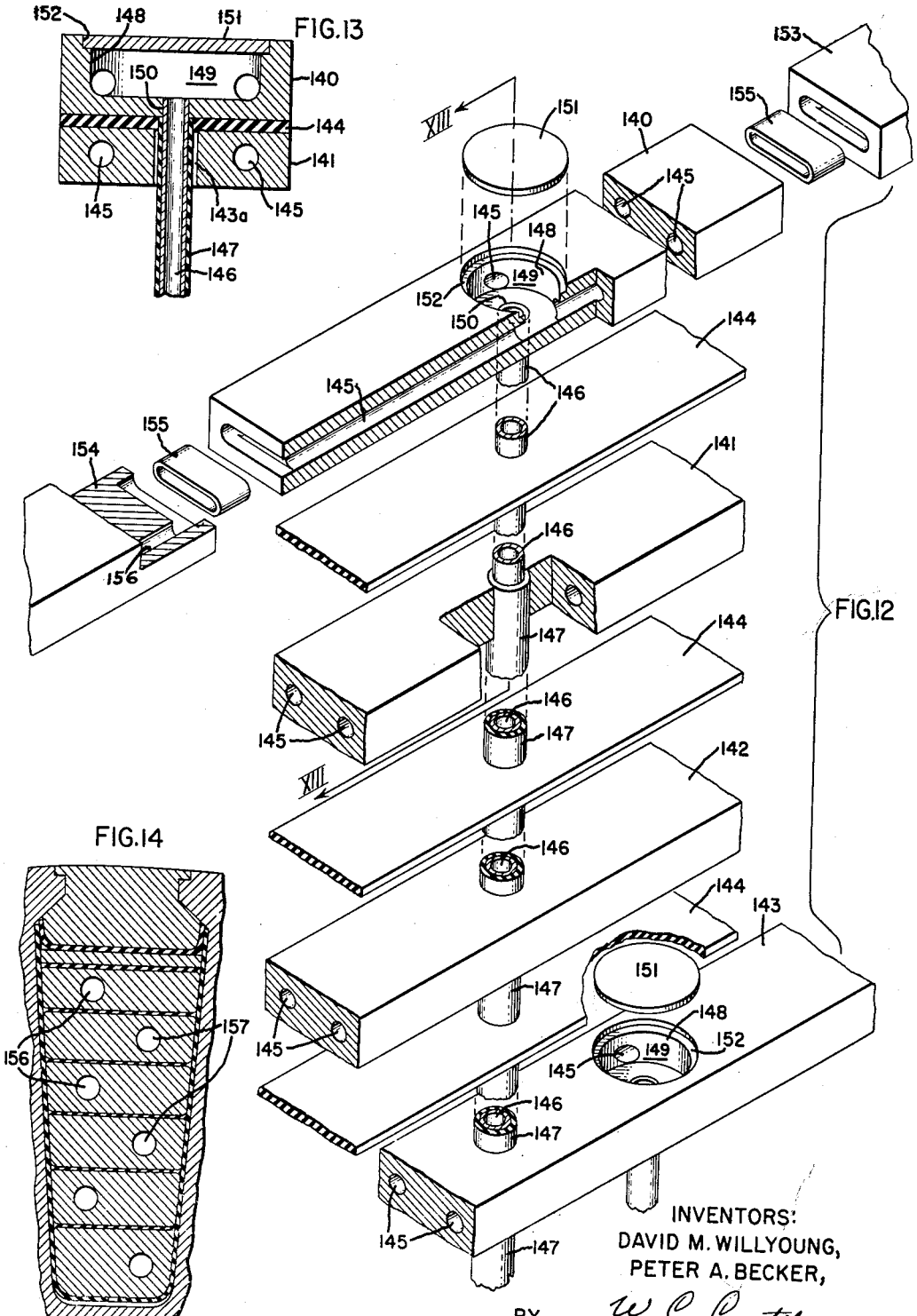

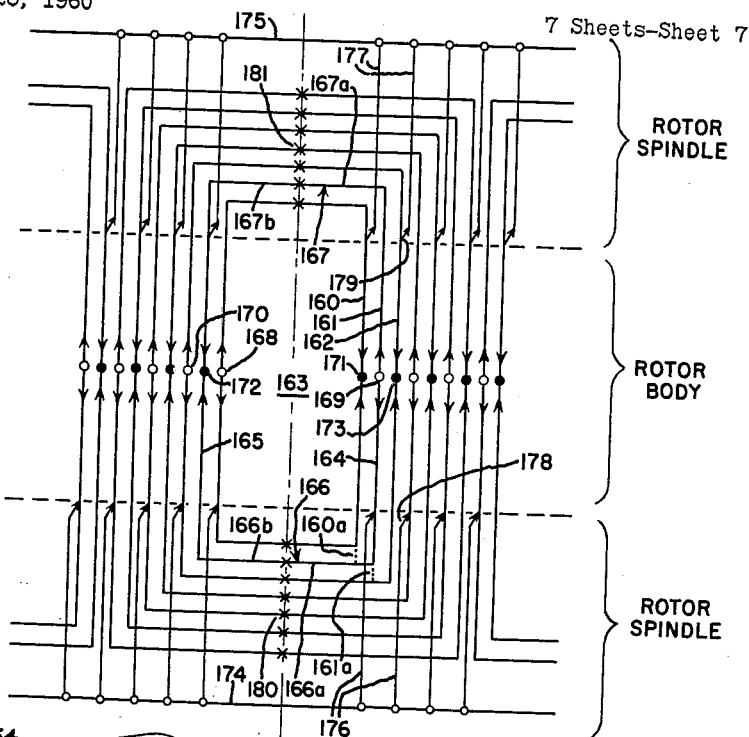
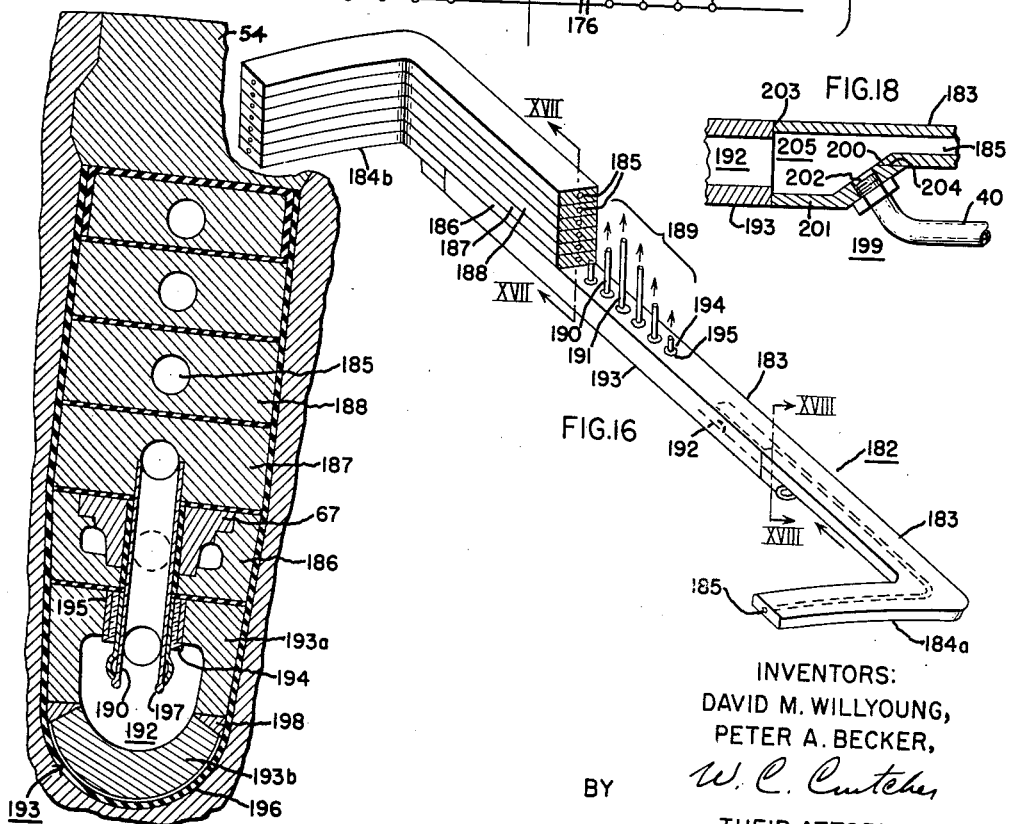
INVENTORS:
DAVID M. WILLYOUNG,
PETER A. BECKER,
BY W. C. Crutcher
THEIR ATTORNEY.

United States Patent Office 3,075,104
Patented Jan. 22, 1963

3,075,104
LIQUID-COOLED ROTOR FOR A DYNAMO-ELECTRIC MACHINE
David M. Willyoung and Peter A. Becker, Scotia, N.Y., assignors to General Electric Company, a corporation of New York
Filed Apr. 28, 1960, Ser. No. 25,263
22 Claims. (Cl. 310—54)

This invention relates to the cooling of dynamoelectric machine rotors and more specifically it relates to an improved arrangement for circulating a liquid coolant in direct contact with the rotor windings through insulated tubes connected with individual conductors, while providing for thermal movement of the windings.

One of the chief limitations to increasing the capacities of large turbine-driven generators without substantially increasing the weight is the temperature of the rotor windings. Increasing the current supplied to the field winding on a generator rotor in order to raise the capacity by increasing effective ampere-turns also increases the amount of heat generated due to losses in the windings. Cooling of the rotor, in order to hold the winding temperatures to reasonable levels, has heretofore been accomplished by circulating air or hydrogen gas through suitable passages in the rotor. "Direct-cooling," or circulating the coolant in close contact with the conductors inside the ground insulation has also resulted in improved cooling.

It is known that liquid coolants are more efficient heat transfer media than gases, generally speaking, and as the capacities of large generators have been increased, liquids have been used in the stator windings to provide improved cooling. A system for circulating liquid to provide "direct-cooling" of the stator windings is disclosed in U.S. Patent 2,695,368 issued to C. E. Kilbourne on November 23, 1954 and assigned to the assignee of the present application.

The following invention relates to "direct-cooled" conductors, with connections made to internal passages defined by the conductors inside the ground insulation, as opposed to proposals that have been advanced for using a liquid to cool the rotor iron itself. The application of liquid cooling to the rotor windings introduces a number of problems not encountered in using liquid to "direct-cool" the stator windings.

Foremost is the problem of the centrifugal force exerted by the liquid in the spinning rotor. This causes tremendous liquid pressures which increase parabolically with the outer radius of the liquid column, if the liquid column extends from the axis of rotation. These pressures preclude the use of present commercially available flexible insulating hoses near the rotor periphery. Naturally the possibilities of leakage at the liquid connections increase with the internal fluid pressure so that connections near the rotor periphery are more vulnerable than those made at the rotor spindle radius. While flexible insulating hoses are out of the question near the periphery, they may be applied judiciously at smaller diameters.

One approach for "direct-cooling" the rotor windings with a liquid is that of the "flooded rotor" principle, wherein the end turns are immersed in liquid which can then enter at one end of the rotor to flow longitudinally through conduits defined by the copper in the slotted portion of the rotor. Such an approach is disclosed in application Serial No. 834,460, filed by B. M. Cain on August 18, 1959, now abandoned and assigned to the assignee of the present application. An individually piped and insulated liquid connection to each conductor conduit is avoided with this method, but a leak-tight container for the entire rotor central body and end turns must be provided, which, at the same time, will retain the liquid against centrifugal force. In the present invention, individual insulated liquid connections to hollow conductors are contemplated so that the conductor walls contain the pressures exerted by the liquid.

Any scheme to make separate insulated liquid connections leading to the interior of the hollow conductors must allow for movement of the windings in the rotor slots due to thermal expansion and contraction. Hence the windings at the location of the liquid connections must be restrained so that no movement can occur to distrub the connections and cause leaks.

It is understood that any rotor spindle conduits, pipes or other manifolds attached to the rotor will be at ground potential, whereas the windings themselves are at the excitation voltage, and that consequently the transfer of the liquid to the windings must be through insulated connections. In addition to the insulation of the feed pipe itself, the liquid column is slightly conductive for some liquid coolants, and therefore the column must be sufficiently long so that leakage currents through the liquid will not result in excessive power loss, substantial electrolytic transfer of metallic ions from one side of the feed pipe insulating section to the other, or generation of excessive gaseous decomposition products of the liquid coolant such as oxygen which might then selectively corrode other parts of the liquid circuit. The liquid used should have good heat transfer characteristics, high thermal capacity, and good dielectric qualities. De-ionized water as a stator coolant is used in the copending application of E. J. Flynn, Serial No. 642,409, filed February 26, 1957, now U.S. Patent 2,999,951 and assigned to the assignee of the present application. Water is readily available and is a very effective coolant in terms of thermal capacity. The tendency of the water to vaporize due to the substantial pressure differences existing in the spinning rotor at the temperatures contemplated can be avoided by pressurizing the liquid as set forth in U.S. Patent 2,970,232 issued to C. E. Kilbourne, on January 31, 1961 and assigned to the assignee of the present application.

It is understood that the electrical arrangement of the field winding on a generator rotor consists of a number of series turns of conductors of fairly large cross-section, symmetrically disposed about the longitudinal rotor pole portions. The magnetizing effect of the rotor winding is given by the product of the turns per pole times the current per turn (rotor ampere-turns). The power which the stator delivers (at constant power factor) is proportional to this product while the rotor losses are proportional to the square of this product. The current density (or amperes per square inch of cross-sectional area of copper in the slot) may be held constant while still subdividing the copper into any desired number of turns, with the ampere-turns remaining the same. However, the rotor current per turn will vary inversely with the number of turns used and the voltage will increase in direct proportion. Over the course of time, certain standard rotor voltage ratings have been recognized as advantageous in the design of turbine generators, in order to limit operational hazards to personnel, allow established protective equipment and practices to be used to reduce the sizes of exciter buses, commutators, generator collector rings, etc.

If it were possible to conduct the cooling liquid hydraulically in series throughout the entire electrical series circuit, one might merely introduce the liquid at one end of the conductor near the bore and withdraw it from the other end near the bore, avoiding many problems of multiple insulated, high pressure liquid connections to the winding. However, this would require that the total coolant flow for the entire series winding pass through each conductor, and that either very high liquid velocities be used with consequent problems of erosion of the conductors by the liquid, or the total coolant area per conductor be drastically increased, reducing the available copper area and increasing the total I²R loss. In addition, the differential pressure across the series hydraulic circuit would be quite large. Hence a compromise must be made between the length of conductor electrically and the length of conduit hydraulically, i.e. the hydraulic flow should be broken into groups of conduits in parallel, while the electrical current flow is in series. The present invention is also concerned with an arrangement providing flexibility in choosing the proper relation between the length of the electrical current path and the hydraulic coolant flow path which utilizes the minimum number of liquid connections subject to leakage.

Accordingly, the primary object of the present invention is to provide an improved liquid-cooled rotor for a dynamoelectric machine employing "direct-cooling" of the rotor windings.

Another object is to provide an improved liquid feed and discharge arrangement for a liquid-cooled rotor which reduces the possibility of leakage at the liquid connections due either to thermal "growth" of the windings or to centrifugal force.

A further object is to provide an improved liquid manifold located radially inward from a radial stack of conducting members for transferring liquid in parallel flow to the separate conductor internal conduits.

Still another important object is to provide a rotor coolant feed and discharge arrangement which allows flexibility in compromising between the length of the electrical flow path and the length of the hydraulic flow path, in order to reduce the number of liquid connections required.

A more specific object in connection with the above is to provide an improved liquid manifold assembly suitable for furnishing liquid to and from the rotor windings to cool one, two, three, or more "half-turns" as desired.

Another object is to provide a liquid manifold so disposed and held as to reduce the effects on the manifold due to thermal expansion and contraction.

Still another object is to provide an arrangement allowing liquid cooling while at the same time providing sufficient turns in the series winding so that abnormally low winding voltages and abnormally large currents and conductor cross-sections are unnecessary.

Still another object is to provide an arrangement for quickly locating a source of liquid leakage and removing it from the rotor.

Another object is to reduce the stresses in a liquid manifold mounted on a rotor due to centrifugal force on the manifold.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIG. 1 is a schematic view of a liquid-cooled generator and its external liquid supply system;

FIG. 2 is an enlarged cross-section view of a rotor portion in the vicinity of the end turns;

FIG. 5 is an exploded perspective view illustrating the method of making the insulated liquid connections to the conductors;

FIG. 6 is a view taken along lines VI—VI of FIG. 5 in a non-exploded section;

FIG. 7 is a perspective view, partly in section, of the manifold chamber;

FIG. 8 is a schematic representation of the liquid flow pattern for conducting coolant through one "half-turn" of the rotor winding, which may be obtained with the manifold arrangement shown in FIGS. 4–8;

FIG. 9 is a schematic view of a modified flow pattern having feed and discharge connections at the same end of the rotor suitable for cooling a full turn of the rotor winding;

FIG. 12 is an exploded diagrammatic view of another modification of the liquid connection assembly which may be used to obtain the flow pattern shown in FIG. 11;

FIG. 13 is a view taken along lines XIII—XIII of FIG. 12;

FIG. 14 is a cross-sectional view of the slot portions of the conductors in an arrangement suitable for use with the manifold assembly shown in FIG. 13;

FIG. 15 is a schematic representation of a flow pattern feeding and discharging from the center of the rotor slots rather than from the end turns;

FIG. 16 is a diagrammatic perspective view of a modified conductor and manifold used to obtain the flow pattern of FIG. 15;

FIG. 17 is an enlarged cross-sectional view of the conductor stack of FIG. 16, taken along lines XVII—XVII; and FIG. 18 is a view taken along lines XVIII—XVIII of FIG. 17.

Figure 3:
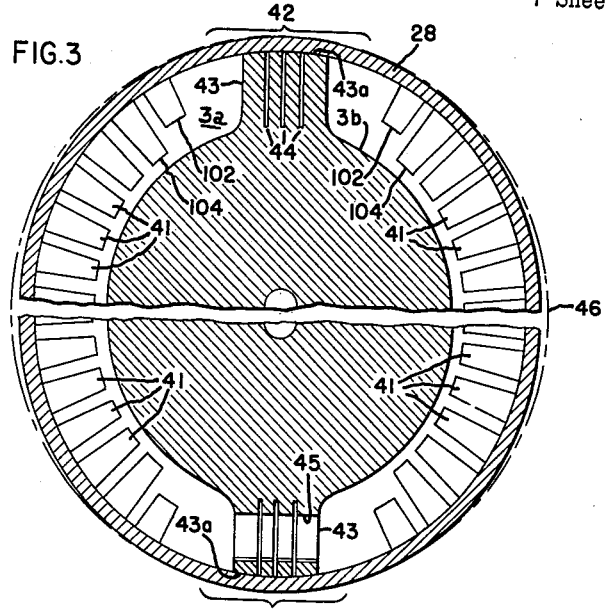
FIG. 3 is a sectional end view of the rotor and retaining ring taken along line III—III in FIG. 1, but omitting the windings.

Generally stated, the invention is practiced by furnishing liquid to a manifold chamber below a radial stack of hollow conductors, conducting the liquid outward through radial feed pipes and transferring it to the internal conduits in the conductors. The manifold assembly accomplishing this transfer is so disposed and retained that it is held against centrifugal force and against thermal expansion and contraction so as to protect the liquid connections.

*General Arrangement (FIG. 1)*

Referring to FIG. 1 of the drawing, a generator cooling arrangement suitable for liquid cooling of both stator and rotor windings is shown in very simple diagrammatic form, it being understood that a great many elements such as valves, pressure regulators, etc., are omitted for clarity. The generator 1 includes a stator 2 defining a central bore 2a within which turns a rotor 3. The rotor has a central body portion 3a and spindle portions 3b and is supported in bearings 4 mounted in casing 5. A suitable seal 6 may be provided to cause the casing 5 to be gas-tight. The generator is coupled to a prime mover such as a steam turbine. A scavenging pump 7 which may be of the jet or other suitable type may be used to reduce the pressure in the casing in order to reduce windage losses and to remove evaporated liquid which might have leaked from the stator or rotor windings.

The stator windings 2b and the rotor windings (not shown) are cooled by an external liquid circulating system shown generally as 8. The conduits and manifold suitable for conducting liquid to the stator windings may be arranged as described in the aforementioned U.S. Patent 2,695,368 of Kilbourne. The means for getting the liquid into and out of the generator spindle 3b may be of any suitable construction and are shown here as supply and collecting rings 9, 10 respectively, feeding the liquid to coaxial conduits 11, 12 in the bore hole through radial openings 13, 14.

Circulating system 8 contains many of the elements described in the aforementioned U.S. Patent 2,970,232 to Kilbourne, although many elements are omitted for purpose of clarity. The cooling water is collected from storage tank 15 and pressurized by pump 16, from which it passes through a cooler 17 to reduce the temperature. The water is de-ionized in a de-ionizer 18, filtered by filter 19, and separated into two portions by a T connection 20 to pass to the stator windings 2b via conduit 21 and to the rotor windings via conduit 22. A booster pump 23 raises the pressure of the liquid supplying the rotor windings by an additional amount to prevent vaporization or cavitation in the bore hole or in other places where local "flow separations" or "vapor pockets" might be formed. After the liquid circulates through the stator and rotor coils, it is returned by way of conduits 24, 25 respectively to storage tank 15, whereupon the cycle is repeated.

The flow pattern of the liquid in the rotor according to one arrangement is shown by the arrows in FIG. 1. The outer arrows 26 passing axially to the right represent flow of the direct-cooling liquid within the internal passages in conductors themselves, while the inner arrows 27 passing along the axis represent a return flow through the bore hole of the rotor 3. Other arrangements which will be discussed provide for return of the liquid axially through the conductors, which, of course, precludes return of the liquid the entire length of the rotor body through the bore hole. In the simple schematic showing of FIG. 1, a liquid flow through one half of a turn is contemplated, although refined modifications allowing flow through two, or three half-turns will be shown in the remaining figures.

The structure for distributing liquid from the bore hole to manifolds supplying each turn of the rotor windings is housed within the retaining rings 28 and the liquid distribution rings 29. Retaining rings 28 also act to hold the end turns of the rotor windings in position against centrifugal force. The liquid distribution rings 29 perform several functions heretofore not found in rotor constructions.

An enlarged cross-section view of retaining ring 28, distribution ring 29, and associated portions of rotor body 3a and rotor spindle 3b may be seen by reference to FIG. 2. The retaining ring 28 is shrunk to the rotor body 3a at one end as shown at 30 and is held against axial disengagement by locking key 31. Details of the locking key 31 may be seen by reference to U.S. Patent 2,960,360 issued to H. D. Taylor on November 15, 1960 and assigned to the assignee of the present application. Retaining ring 28 is secured in a suitable manner on its other end to a massive centering ring or flange 32. Centering ring 32 defines a number of circumferentially spaced slots 32a passing therethrough to allow any liquid leakage to escape from inside the retaining ring.

Liquid distribution ring 29 includes a collecting annulus 33 which has a portion 33a overhanging the end of retaining ring 28 by virtue of circumferential groove 28a in the retaining ring, so that any leakage liquid flowing through grooves 32a will be immediately thrown to the interior of portion 33a. A number of circumferentially spaced radial dividers 33b retain the liquid generally in the circumferential location whence it originated. A circumferential wall 33c prevents the liquid caught between radial dividers 33b from flowing into the unobstructed circumferential groove 33d until a certain amount accumulates.

Thus a slow leak as might develop, for example, from gradual corrosion of one of the brazed joints in the system causes a gradually increasing mechanical unbalance to develop in leakage collecting ring 29 which is communicated to the rotor and detected by the conventional vibration monitoring instruments used in such large rotating machines. The radial depth of the spaced dividers 33b and wall 33c is proportioned so that with one chamber fully flooded the vibration is objectionable but not hazardous. Continued accumulation of leakage beyond this point causes leakage to spill over the circumferential wall 33c into the unobstructed groove 33d, where it distributes itself uniformly around the periphery without adding further to the mechanical unbalance so as to increase it to dangerous proportions.

Preferably a two-phase liquid coolant such as de-ionized water is utilized with proper thermodynamic characteristics so that in cooperation with vacuum pump 7, the generator can continue to be operated for a convenient period even after the need for servicing is indicated by a gradually increasing mechanical unbalance. This is accomplished by reducing the pressure in the generator air gap by means of pump 7 to a point where the saturation temperature of liquid coolant is below the temperature of the collecting annulus 33, causing accumulated leakage to evaporate and be withdrawn harmlessly from the generator. This would preferably be done periodically rather than continuously so that the rate of accumulation of leakage could be monitored. To prevent flashover of the high voltage armature windings during reduced pressure operation of the air gap it may be necessary to remove voltage and load during the scavenging cycle.

Distribution ring 29 also includes a centrifuging and supply member consisting of hollow annulus 34. The collecting annulus 33 is shrunk onto the hollow annulus 34, which, in turn, is shrunk onto the rotor spindle. Hollow annulus 34 defines a centrifuging and supply chamber 35 and also incorporates inspection plugs 34a which can be removed in order to clean out foreign substances which are centrifuged from the liquid. Chamber 35 is shown as supplied from the bore hole by a radial pipe 36, although chamber 35 may also be supplied in a suitable manner from a sealed pressurized "scroll" on the spindle. The latter would, of course, reduce the pressure level throughout.

If the liquid is used to cool an odd number of "half-turns" in series hydraulically, a similar liquid distribution ring 29 will be disposed at the opposite end of the rotor. On the other hand, if the liquid is supplied and discharged from the same end of the rotor, such as when an even number of half-turns in series hydraulically is cooled by the liquid, there need only be one liquid distribution ring 29, which, of course, requires that chamber 35 be partitioned into supply and discharge portions.

From chamber 35, the liquid flows inward through suitable conduits 34b to a hollow spindle ring 37 defining a chamber 38. A series of circumferentially spaced tubes 39 connect the spindle distributing ring 37 to insulated tubes 40, one of which leads to each liquid manifold assembly later to be described. The insulated tubes 40 are held in suitable grooves by insulated blocking 40a under the end turns and centering ring.

Instead of the hollow spindle ring 37, axially extending boxes (not shown) can be located in longitudinal grooves on the spindle beneath the end turns with hoses 40 running circumferentially to the boxes and held by blocking 40a.

FIGS. 2–14 of the drawings illustrate one basic modification of the invention wherein the liquid enters and leaves the windings in the end turns, whereas the remaining FIGS. 15–18 illustrate a second basic modification wherein the liquid is supplied at the centers of the slots.

*End Turn Manifolding (FIGS. 2–7)*

FIG. 3 of the drawing shows an end view of the rotor with the windings omitted for purpose of clarity. The retaining ring 28 and the rotor spindle portion 3b are shown here in cross-section. Between the retaining ring and the spindle can be seen the end of rotor body portion 3a with the usual circumferentially spaced longitudinally extending rotor slots 41 which are symmetrically disposed in pairs on either side of the rotor pole portions 42. In addition to the conventional rotor structure, however, are rotor lugs 43 which are aligned with the pole portions 42 and are formed as an integral part of rotor spindle 3b. Since the rotor body and spindle are generally fabricated from a single forging, lugs 43 also axially join and form a part of the rotor body portion 3a at one end (see FIG. 4). Lugs 43 define arcuate shrink-fit surfaces 43a at their radially outer sides and include a number of narrow axially extending slots 44 for reducing stresses imposed by the retaining ring. The rotor lugs 43 rigidly secure the liquid manifold assemblies (later to be described) in a number of axially spaced slots shown in cross-section at 45, there being at least one manifold assembly for each pair of winding slots 41. Since the manifold assemblies constitute considerable weight, the lugs 43 are subjected to great force and, to this end, retaining ring 28 is used to relieve these stresses as the rotor increases speed. By reference to the true circle shown by dot-dash line 46, it will be observed that retaining ring 28 assumes a slightly elliptical shape with the major axis aligned with lugs 43. The amount of distortion of retaining ring 28 is greatly exaggerated here for purposes of description, and it will be understood that the actual distortion is very slight. As the rotor comes to speed, retaining ring 28 tends to assume a true circle as shown by 46 and presses radially inward toward the rotor axis on lugs 43 in order to relieve the increasing outward forces imposed on the lugs by the manifold assemblies.

Figure 4:
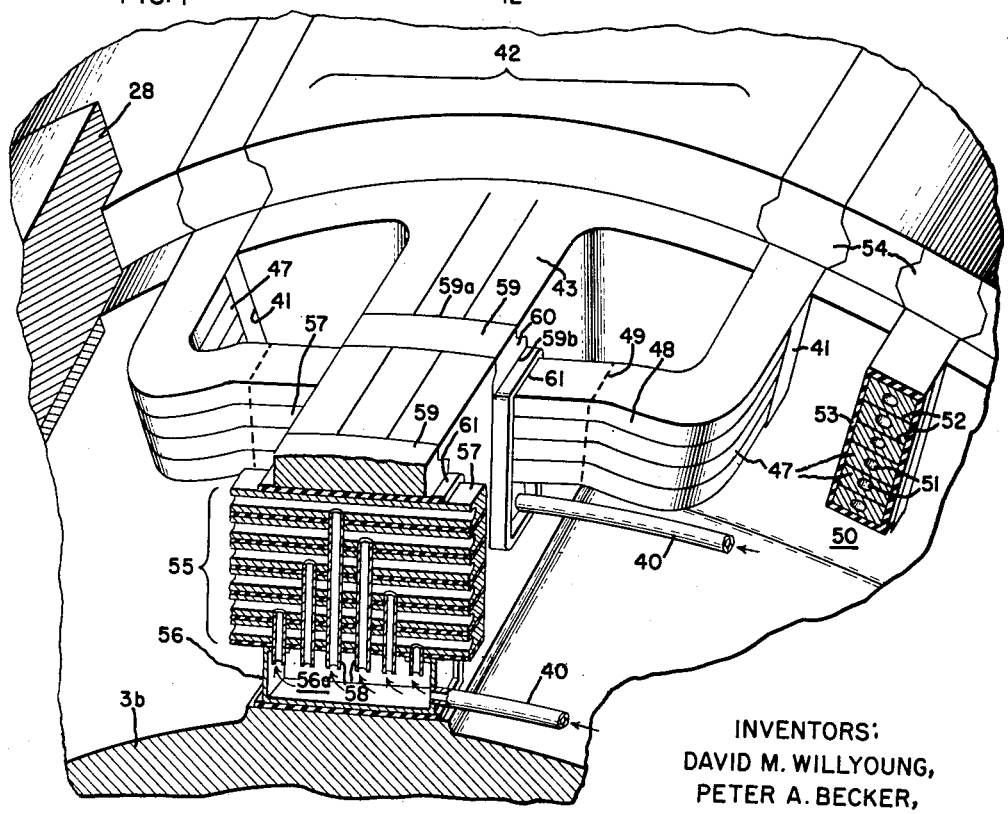
FIG. 4 is a perspective diagrammatic view, partly in section, showing the manner in which the special rotor lug holds the liquid manifold in place when it is located on the end turns.
Figure 10:
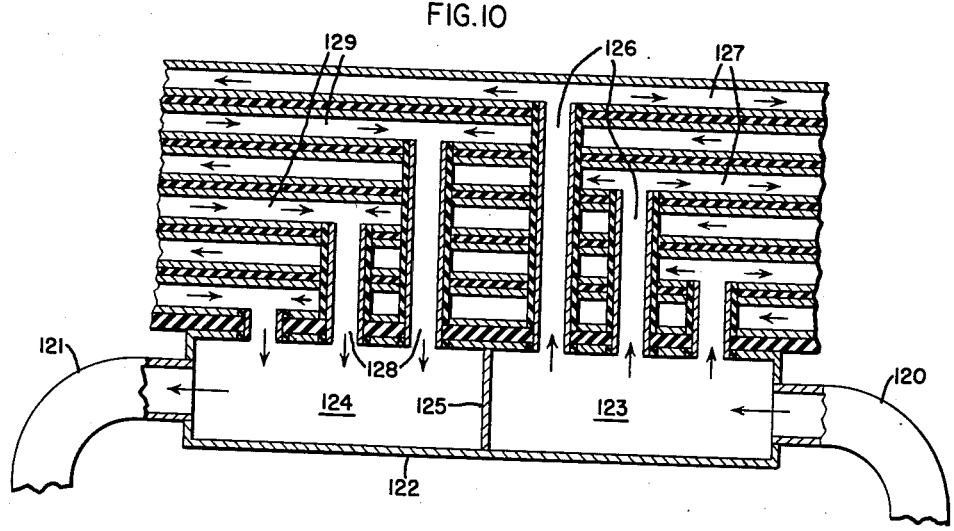
FIG. 10 is a diagrammatic view of a modified manifold assembly used to obtain the flow pattern of FIG. 9.

Referring now to the perspective view of FIG. 4, the stacked conductors in the first pair of winding slots 41 on either side of pole portion 42 comprise radially stacked and longitudinally extending slot-lying portions 47 and generally circumferentially extending portions 48. Circumferential portions 48 and the exposed parts of portions 47 comprise the rotor end turns. The ends of portions 48 on either side of lug 43 are attached to the ends of the conducting members in the manifold assembly as indicated at 49 by welding, brazing, or other suitable joining methods which will prevent leakage from the internal conduits in the conductors. A cross-section taken through the turn next removed from the pole portion 42 is shown at 50 where it is seen that the slot-lying conductors 47 define internal conduits 51, the conductors being insulated from one another by turn insulation 52 and insulated from the rotor metal by ground insulation 53. Slot wedges 54 hold the conductors in place in the winding slots.

A cross-sectional view and greatly simplified version of a typical manifold assembly is shown generally at 55. This manifold assembly 55 would be connected to the winding conductors shown at 50. Manifold assembly 55 essentially comprises a manifold box 56, defining a reservoir chamber 56a, a number of radially-stacked circumferentially-extending conducting members 57, and a number of radial feed tubes 58. Each manifold box 56 is supplied by a tube 40 as previously shown in FIG. 2. Tube 40 may be insulated if the manifold assembly is not grounded. The radial feed tubes 58 are insulated from the manifold block 56 and from the conducting members 57 through which they pass. The details of how the insulation is accomplished without reducing the integrity of the liquid seal and without blocking the flow of the liquid will be described later. It can be seen from the arrows that the liquid enters manifold box 56 and is subdivided to flow radially through the tubes 58, one of which terminates in each conducting member 57. At the point where each radial feed tube 58 joins its respective conducting member 57, the flow further divides and flows in both directions.

The diagrammatic manifold assembly shown at 55 is only one type and other modifications will be shown. The type shown in FIG. 4 is particularly suitable for liquid flow through one "half-turn" of the rotor winding before its discharge. A manifold similar to 55 would be required at the other end of the rotor body 3a, the only difference being that the liquid would flow radially inward through feed pipes 58 to be discharged through an insulated hose similar to hose 40.

Each manifold assembly 55 is held in place by a lug wedge 59 which is provided with dovetails 60. The top 59a of lug wedge 59 is arcuate to correspond to the surface of the lug itself and the bottom surface 59b of the lug wedge is flat to correspond to the top conducting member 57. Manifold assembly 55 may be insulated from the lug 43 by insulation 61.

The details of the parts and method of assembly of manifold 55 may be seen by reference to the following FIGS. 5, 6, and 7. FIG. 5 shows an exploded view of the manner in which the radial insulated feed tubes are connected to the conducting members. Only the top two conducting members and two radial feed tubes are shown here, as it will be apparent from the description how the remainder of the manifold assembly is constructed. Here the top conducting member 65 and its immediately adjacent underlying conducting member 66 are shown separated from one another in order to see the special bypass plugs 67 which define central holes 68. Each conducting member is separated by a sheet of turn insulation 69 which need not be very thick, since it only withstands turn-to-turn potential, which may be on the order of 3 to 5 volts. The turn insulation defines holes 69a through which the radial feed tubes will pass.

Each radial feed tube comprises an inner metal tube 70 preferably made of stainless steel which can be brazed to a respective conducting member to form a leak-tight seal, and an outer insulating tube 71 of insulating material such as the laminated phenolic resin composition sold by General Electric as "Textolite," which may be slipped over inner tube 70 after brazing has been accomplished. Each conducting member 65, 66 also defines a longitudinally extending central conduit 72 which opens into a central cavity 73 cut transversely into the conducting member from one side. The top edge of cavity 73 is cut back as at 74 to form a seat for bypass plug 67. At the bottom of cavity 73 a recess 75 (FIG. 6), having a smaller diameter than that of cavity 73, is cut transversely into the conducting member in order to receive the lower end of plug 67. A central hole 76 in the bottom of this recess is provided for the insulated radial feed tube 70, 71 to pass through.

The radially outermost end 77 of each metal tube 70 is connected to communicate with the internal conduit 72 of each respective conducting member. In order to do this, the metal tube 70 passes through a hole 78 from the bottom of the conducting member to which it is to be connected and is furnace-brazed or welded to the metal of the conducting member. It is very important to obtain a good leak-tight connection between the metal parts since the pressures encountered at the radially outermost points of the rotor where tubes 70 terminate will be extreme, perhaps on the order of 2,000 to 5,000 p.s.i. Metal tubes with brazed or welded joints are the only presently known means of withstanding such pressures. It is to be noted that the conduits 72 in the conducting members are surrounded by a substantial metal thickness, and that, although the metal tubes 70 are not of substantial wall thickness, they are supported by the metal surrounding them in the conducting members and by the metal surrounding them in the plugs 67. Furthermore, by selecting a material such as stainless steel which retains very high strength levels even in the annealed condition, adequate factors of safety can be obtained without excessive wall thicknesses.

Each special bypass plug 67 is comprised of a large diameter seating portion 79 joining an underlying slightly smaller diameter portion 80. Beneath portion 80 a contoured undercut wall 81 terminates in the bottom end 82 of the plug which is of a diameter corresponding to that of recess 75. This contoured wall 81 defines, together with the walls of cavity 73, a bypass conduit 83 which may be seen more clearly by reference to FIG. 6.

FIG. 6 illustrates a non-exploded view taken transversely through the top two conducting members 65, 66 after they have been assembled. There the bypass plug 67 is shown in place and it can be seen that the bypass conduit 83 allows the liquid by bypass tubes 70, 71 which pass transversely through conducting member 66. The plug 67 is sealed at its upper end in the cutout portion 74 and is sealed at its lower end in the hole 75 by a suitable means such as brazing. This will insure that a leak-tight bypass conduit 83 will transfer liquid from the conduit 72 on one side of the radial tube to the conduit 72 on the other side of the radial tube, without allowing leakage in any way, despite the fact that the radial tube passes through the center of the hollow conducting member.

The next underlying conducting member is assembled in a similar fashion, except provision must be made for two radial feed tubes. To accomplish this bypassing, two plugs 67 are required or they may be also manufactured as an integral member as shown at 67a.

Naturally, the fewer such connections that have to be made, the less likelihood of a leak. In the embodiment shown and described thus far in FIGS. 1–6 involving passage of the cooling liquid through one half-turn of each field coil on the rotor, there is one such manifold assembly for each coil at each end of the rotor. Each manifold assembly, in turn, requires one conducting member and one radial feed tube for each conductor in the rotor winding slot. In the embodiment shown, there are six conductors in a slot with the exception of the pair of slots closest to the poles. Here, due to lack of space, the number of conductors in the slots adjacent the pole are only four, hence the manifold assembly only comprises four conducting members and four radial feed tubes. It will be observed that the cross sections of the conductors will be larger when fewer conductors are used. A compromise has to be reached in design, since fewer cooling connections are desirable from a liquid leakage standpoint, yet more conductors per slot are desirable from an electrical standpoint.

The manner in which the lower or radially innermost ends of the feed tubes in each manifold assembly are connected to the manifold box may be seen by reference to FIG. 7. Here the manifold box, shown generally as 85, is generally of rectangular shape with parallel sides 86, 87 spaced to fit within the lug slot 45, an integral cover 88 defining a number of spaced openings 88a, and end pieces 89 which may define one or more openings 89a according to the flow pattern desired. In FIG. 7 only one such opening 89a is shown making the manifold box suitable for either a simple inlet or outlet box. A bottom cover plate 90 is made separately so that it can be welded in place afterward to define a reservoir 91 within the box. Sealed in the openings 88a are a number of ceramic bushings 92. These are spaced from openings 88a by outer tubular attachment members 93 which are brazed both to ceramic bushing 92 on the outside and to the inside of openings 88a. A similar inner tubular attachment piece 94 is brazed to the inside of each ceramic bushing 92 so as to receive the free end of a metal feed tube 70. The purpose of the attachment tubes 93, 94 is to form intervening transition members between the ceramic material of bushings 92 and the stainless steel or similar material used in radial feed tubes 70 and manifold box 85. If the materials selected were such that the insulating member 92 could be attached directly to the manifold box on the outside and to the radial feed tube on the inside, such intervening attachment tubes would, of course, not be necessary. In the practical embodiment shown here, however, the ceramic insulator used can be made of alumina and the material in the radial feed tubes and the manifold box can be made of stainless steel. It is desirable, therefore, to use a transition member intervening between the stainless steel and the alumina which will bond to both. Attachment pieces 93, 94 here consist of 42% nickel iron composition.

Disposed on top of the box 85 is an insulating block 95 contoured on its lower side to fit the shape of the box top 88 and defining a number of spaced openings 95a which receive the upper ends of bushings 92. Block 95 and bushing 92 naturally serve as the main insulating members between the conducting members, one of which is shown above as 96, and the manifold box 85. The outer insulating tubes 71 which encase each metal tube 70 serve to insulate metal tubes 70 from conducting member 96.

The manifold assembly shown in FIGS. 5–8 may be assembled as a sub-unit, tested, and later placed in slot 45 of the end lugs 43, and opposite ends of each conducting member 65, 66 . . . 96 can then be welded or brazed to the ends of the half-turns disposed in a pair of slots on either side of the manifold assembly.

The method of assembly of the manifold assembly shown in FIGS. 5–7 will now be described. First, the bypass plugs 67 are all brazed in place or secured in cavities 73 by other suitable means such as welding. It is necessary that a good seal be obtained both around the recesses 74 and the recesses 75 in the conducting member in order to prevent leakage. Next, each bare metal feed tube 70 is securely sealed in a hole 78 in each conducting member. A slight clearance around the tube 70 inside hole 78 allows the bonding metal to completely fill the clearance space and form a good seal. Naturally, since each radial feed tube supplies or discharges from a different radial height, all the radial feed tubes will be of different lengths and must be matched to the proper conducting members according to the flow pattern desired.

After each tube 70 has been secured to the proper conducting member, it is desirable to invert conducting members 65, 66, etc., with the tubes 70 extending upwardly and to make the sub-assembly up-side-down as follows: The turn insulation 69 for the top (now lowermost) conducting member 65 is slipped over metal tube 70 by means of the hole 69a in the insulation. Next, insulating tube 71 is placed over the bare tube 70. Then the next conducting member 66 is placed on top of member 65 with the insulated tube 71 passing through hole 68 in the bypass plug and the members are brought snugly together. It will be observed that now there is one insulated radial feed tube and one bare radial feed tube extending up from the partial assembly.

The same sequence of operations again takes place with a piece of turn insulation 69 now having two holes 69a in it going over the two protruding tubes followed by a length of tube insulation 71 going over the bare tube 70. The next conducting member (not shown) is lowered over the insulated radial feed tubes with the feed tubes passing through bypass plug 69a in this conducting member whereupon the partial assembly will have three protruding tubes. The foregoing procedure is followed until all conducting members with their respective feed tubes have been assembled and then the assembly is turned over to the right-side-up position.

The manifold box 85 is assembled without the bottom cover plate 90 in position. The transition pieces 93, 94 can then be pre-brazed to the ceramic bushings 92 in a separate furnace-brazing operation, following well established practice for securing ceramic-to-metal seals of high integrity. The bushing with transition pieces can then be bonded into the holes 88a in manifold box 85 using furnace-brazing or other suitable means. Then insulating block 95 is put over the ends of the bushings 92 and the manifold box slid over the extending bare ends of feed tubes 70 so that the ends of tube 70 pass down inside transition tubes 94, where they may be welded or brazed to form a leak-proof joint. Feed or discharge pipe fittings and the bottom cover piece 90 are then welded in place and the manifold assembly is complete and may be appropriately "leak-tested" before placing in the rotor.

*Liquid Flow Patterns (FIGS. 8–11)*

FIG. 8 shows a diagrammatic view of the inner two coils about a rotor pole portion with the liquid coolant flow indicated by the arrows. Here the inner coil 101 has only four turns and is disposed in a shallow pair of slots symmetrically disposed with and immediately adjacent the pole. The next coil 102 has six turns and is disposed in a pair of normal depth slots circumferentially spaced from the first pair of slots on either side of the pole. The remaining coils all comprise six turns each for that given pole on the rotor, but are omitted for purposes of clarity. Inlet manifolds are indicated by brackets 103 and outlet manifolds by brackets 104. It will be observed that inlet and outlet manifolds 103, 104 are located in the centers of the end turns of coils 101, 102. Coil 101 and coil 102 are connected electrically in series by the lead 105. The hydraulic connections are indicated by small circles with the flow to and from these connections indicated by the arrowheads. Coil 101 has inlet connections 106 and outlet connections 107 for each turn. Coil 102 also has inlet connections 108 and outlet connections 109 for each turn. Each group of hydraulic connections 106—109 for a given end turn of a coil are thus supplied or discharged using a manifold assembly 103, 104 such as described previously. By following the arrows, it will be seen that a given radial feed tube in manifold 103 on coil 102, for instance, furnishes liquid to the connection 108 which splits into two portions, each portion traversing a half-turn of coil 102. The portions discharge from two different connections such as 109 at the other end of the rotor at slightly different radial heights due to the fact that the coil is continuous. Thus the pressure drop of the liquid is determined by the length of the internal conduit in a half-turn, two such conduits being connected in parallel. This arrangement provides the lowest pressure drop and lowest liquid velocity and required coolant area possible if the liquid is to be supplied from one end of the rotor, and internal connections in the slot are not to be made.

Reference to FIG. 9 of the drawing shows the flow pattern for a modification of the invention still using manifolds in the end turns of the rotor winding. This flow pattern has both the feed and discharge liquid connections at the same end of the rotor, and for this reason does not require manifold assemblies or a liquid distribution ring 29 at the opposite end of the rotor. Again, the inner coil 110 comprises four turns and the next coil 111 comprises six turns. The remaining coils (not shown) also each contain six turns. Coil 110 has inlet connections 112 and outlet connections 113 alternating in a radial direction. Similarly, coil 111 has inlet connections 114 and outlet connections 115. Again the path of the liquid coolant is shown by the arrowheads and it will be observed that the fluid from a radial feed tube supplying connection 114 splits into two portions, each of which traverses a full turn before discharging from a connection 115.

One of the advantages of this flow pattern is that coolant counterflow is obtained in adjacent turns with improved temperature distribution therefrom. A typical conductor 116 on coil 111 receiving relatively cool liquid from the inlet connection 114 is immediately adjacent a conductor 117 containing liquid which has traversed almost a full turn. The temperature is thus equalized through the relatively thin turn insulation.

From the detailed description of the previous manifold assembly, it should be apparent how the manifold assembly can be modified to furnish these alternating inlet and outlet connections. Two manifold assemblies can be placed side by side in a lug slot, or preferably the lower manifold box can be divided into two portions as shown in the simplified diagrammatic view of FIG. 10. There no attempt has been made to show the insulating details of the manifold assembly, but it can be seen that an inlet tube 120 and an outlet tube 121 are connected to a manifold box 122 separated into reservoir chambers 123, 124 respectively, by divider 125. Radial feed tubes 126 connected with chamber 123 furnish alternate conducting members 127, whereas feed tubes 128 connected with discharge chamber 124 supply conducting members 129 interposed between members 127. The flow pattern will be apparent.

Figure 11:
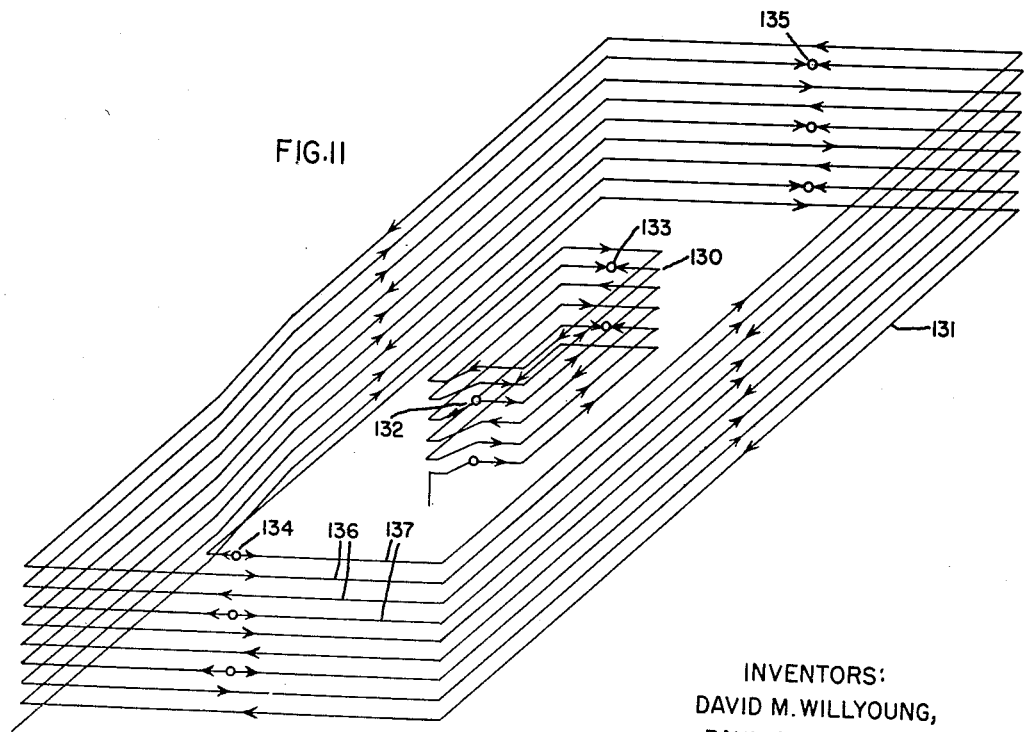
FIG. 11 is yet another schematic representation of a third flow pattern where three "half-turns" are cooled in series.

The flow pattern for yet a third modification is illustrated in simple diagrammatic form in FIG. 11. Here, the inner coil 130 is shown inside a second coil 131. Coil 130 has inlet connections 132 at one end of the rotor and outlet connections 133 at the other end of the rotor. Similarly coil 131 has inlet connections 134 at one end of the rotor and outlet connections 135 at the other end of the rotor. It will be observed that there are two intervening end turns between each hydraulic connection, which greatly reduces the number of connections which have to be made, thereby allowing more conductors of smaller cross-section in each slot for the same number of connections. For example, on the inlet end of coil 131 there are two end turns 136 with no connection made thereto between two end turns 137 which are connected with cool liquid. By following the arrowheads it will be observed that liquid entering a connection 134 divides into two portions and each portion of the liquid traverses three "half-turns" before it discharges from a connection 135 at the other end of the rotor.

Although the pressure differential required to force the liquid through the internal conduits of three "half-turns" in succession is greater than the previous modifications shown, the advantages in reducing the number of liquid connections will be readily apparent. Since the number of hydraulic connections which can be made on an end turn is relatively limited by the space available on the rotor spindle (the greater the number of radial feed tubes, the greater the peripheral distance on the spindle required), this reduction of liquid connections possible with the modification of FIG. 11 allows more turns to be used per slot with lower cross-section of copper required. For example, 18 turns per slot might be used without increasing beyond the six liquid connections. This in turn allows the use of higher exciter voltage and less current, which is desirable in many cases, in order to conform to established ratings.

The manifold assembly described in FIGS. 5–7 may be modified to use with the flow pattern shown in FIG. 11 by simply interposing between each conducting member 65, 66 shown in FIG. 5 two conducting members which have internal conduits arranged to avoid the radial tubes, such as offset internal conduits, or alternately by employing bypass plugs 67 without attaching tubes 70 to the conductor.

*Modified End Turn Manifold (FIGS. 12–14)*

A manifold assembly which may be more useful for the flow pattern of FIG. 11 does not require bypass plugs and is shown in FIG. 12. There an exploded view, partly in section, is illustrated with the top four conducting members shown as 140—143. A piece of turn insulation 144 separates each conducting member. Each conducting member defines two parallel conduits 145 placed side by side. The radial feed tubes as before comprise inner metal tubes 146 insulated from the conducting members by outer insulating tubes 147. It will be seen that the spacing between conduits 145 is such that a radial hole 143a large enough to encompass the outer diameter of tube 147, will allow the insulated feed tube to pass through the conductor without intersecting longitudinal conduits 145. This may be seen by reference to FIG. 13 which is a nonexploded cross-section through the top two conductors 140, 141, along line XIII—XIII. Every third conducting member such as members 140, 143 here are furnished with a milled cavity 148 which intersects conduits 145 and defines a feed or discharge chamber 149. In the bottom of chamber 149 is a small conduit 150 which is of the proper diameter to receive the inner tube 146 so that tube 146 can be brazed with a leak-tight seal. This is illustrated clearly in FIG. 13. Chamber 149 is closed by a cover piece 151 which fits in a recess 152, allowing chamber 149 to be sealed after tube 146 is brazed in place.

FIG. 12 also shows the ends 153, 154 of circumferentially extending portions on one end turn. These ends 153, 154 are welded or brazed to the ends of the conducting members 140 after the manifold assembly is complete and placed in the rotor lug. Flattened hollow inserts 155 keep the conduits open while this welding is being performed and serve as a flow transition piece between conduits 145 in the conducting members and the internal conduits in the end turn portions 153, 154. The conductor ends 153, 154 and the ends of conducting members 140 are milled out as shown to accommodate the inserts 155.

The reason for the modification of the manifold as shown in FIGS. 12, 13 is because of the simplicity of bypassing a radial feed tube through the conducting member. As previously seen in FIG. 11, two intervening conducting members having no hydraulic connections are placed between every conducting member which does have a hydraulic connection. It will be appreciated that if the manifold assembly shown in FIGS. 5–7 is used, there must be a bypass plug used each time a radial feed tube passes through a conducting member. This would require a great many such bypass plugs, each being a potential leak. With the embodiment shown in FIGS. 12, 13, however, only a simple hole through the conductor is necessary.

It will be observed that the conduits in the conductor ends 153, 154 are offset from the centerline of the conductor to opposite sides. FIG. 14 shows a cross-section through a rotor slot with a stack of such conductors having offset conduits. Inasmuch as liquid is a much more efficient heat transfer medium than gas, the conduits, shown as 156, 157, etc., may be of relatively small diameter. Therefore, improved temperature distribution may be had by offsetting alternate conduits in each direction from the longitudinal centerline of the bar so that a coolant conduit 156 serves to cool a portion of the conductor bar immediately above and below it while the same action takes place on the other side of the slot by means of offset conduits 157. This greatly improves the temperature distribution in the slot. The circumferential distance between conduits 156 and conduits 157 is selected to correspond with the distance between conduits 145 in the conducting members 140—143 so that a simple milling operation from the ends of these members causes the conduits to be aligned with one another.

The preceding FIGS. 2–14 employed a manifold assembly held in a lug at the midpoint of the end turns. The manifold assemblies were wedged in slots in the lug to prevent radial movement of the manifolds and the sides of the lug slots prevented axial movement of the manifolds. Thus thermal expansion and contraction of the conductor bars longitudinally of the rotor in the slots was permitted by the flexibility of the end turns on either side of the manifold assembly.

A basic modification of the invention may be seen by reference to the remaining FIGS. 15–18 of the drawings. With this modification, it is not necessary to use a lug (like 43 in FIG. 3) on the spindle portions of the rotor.

*Slot Center Manifolding (FIGS. 15–18)*

FIG. 15 illustrates a flow pattern wherein the manifolds are disposed at the center of the slot portion of the conductors rather than at the center of the end turn portions of the conductors. In FIG. 15, showing the rotor in developed plan view, a number of coils 160, 161, 162, etc., are shown in developed plan view about the pole portion 163 of the rotor. Each single line, such as 161, represents a radial stack of conductors in the slot of the central body portion of the rotor. Each coil, for example coil 161, has a stack of conductors comprising slot-lying portions 164, 165 symmetrically spaced from the magnetic pole 163 of the rotor and connecting end turn portions 166, 167. It will be understood by those skilled in the art that the top turn of coil 160 is connected with a cross-piece to the top turn of coil 161 shown by dotted line 160a and that similarly the bottom turn of coil 161 is connected to the bottom turn of coil 162 as shown by dotted line 161a, with the coils wound in opposite directions thus forming an electrically connected series of coils of the same polarity to produce a magnetic field. The remaining electrical connections are omitted for purpose of clarity.

Coils 160, 161, 162 here have inlet manifolds 168, 169, 170 respectively and outlet manifolds designated 171, 172, 173 respectively. These inlet-outlet manifolds 168—173 are disposed in the slot at substantially the mid-portion of the slot length, in order to minimize the effect of thermal expansion and contraction. An annular liquid inlet chamber disposed around an end portion of the spindle is shown here diagrammatically as the single line 174. An annular outlet chamber at the other end of the rotor body and also disposed around the rotor spindle is represented by the single line 175. These annular inlet and outlet distributing chambers may be similar to chamber 38, as described in connection with FIG. 2 or can also lie axially in slots in the rotor spindle.

The liquid is fed axially to each coil manifold by a number of flexible hoses 176 and is withdrawn axially at the opposite end of the rotor by hoses 177. Hoses 176, 177 may be similar to the afore-described insulated hoses 40 shown in FIGS. 2 and 4 of the drawings. Since these hoses are connected to the coils near the ends of the slots, as indicated by arrows 178, 179, they must be flexible in order to absorb the thermal movement of the conductors in the slots, and they must of course be suitably insulated electrically.

Each turn of the coils 160—163 is manufactured in two halves. For example, coil 161 consists of several turns, each of which is made up of two C-shaped members. Each such C-shaped "half-turn" of coil 161 is comprised of a slot portion 164 and end turn portions 166a, 167a. The corresponding "half-turn" is also comprised of conjugate slot portion 165 and end turn portions 166b, 167b. These two C-shaped "half-turns" are joined together at the center of the end turns during assembly at the points indicated by the X's as shown at 180, 181.

A better understanding of the construction of the "half-turn" and the method of feeding the slot center manifold may be had by reference to FIG. 16 of the drawing. There a single "half-turn" shown generally as 182 is comprised of a slot portion 183 and end turn portions 184a, 184b. The "half-turn" is provided with an internal continuous cooling conduit 185 similar to the previously discussed conductors. "Half-turn" 182 shown is the lowermost in the slot and portions of the other "half-turns" completing the stack in the slot are shown at 186, 187, 188, etc. These members similarly incorporate internal cooling conduits 185.

The liquid manifold for "half-turn" 182 is illustrated diagrammatically by the bracketed portion 189. Manifold 189 is situated in the center of the slot so that thermal expansion and contraction in the slot portions 183 can take place on either side of manifold 189 without imposing stresses on the numerous manifold joints. Radial feed tubes 190, 191, etc., are shown, each being of a different radial length so as to terminate in a different turn so as to connect with the internal conduit 185 therein.

Radial feed tubes 190, 191 are connected at their radially innermost end to a manifold reservoir chamber 192 defined within a special transition piece 193 shaped to fit in the bottom of the slot (FIG. 17). Radial feed tubes 190, 191 are brazed to ceramic insulators 194 which in turn are brazed to the inside of openings 195. These connections may be made in the same manner as previously described in connection with the manifold box illustrated in FIG. 7.

FIG. 17 is a cross-section taken along lines XVII—XVII in FIG. 16. Here it will be seen that bypass plugs 67, which may be identical to those described in connection with FIGS. 5 and 6, are used to bypass conduits 185 in order that the radial feed tubes will not interfere with longitudinal flow.

The manifold 189 is built up from top to bottom exactly as described in connection with FIGS. 5 and 6 except that in this case the conducting members consist of complete "half-turns" such as 182. A special manifold piece 193, however, is used instead of the manifold box previously described. Reference to FIG. 17 will illustrate that the manifold member 193 is comprised of a channel-shaped member 193a and a cap 193b. Channel 193a and cap 193b run the entire slot length and are contoured to fit the bottom of the slot 196. Channel 193a and cap 193b may be manufactured in two pieces so that the radially innermost ends of radial feed tubes 190 can be brazed to the transition members 194 from the inside to form a seal as illustrated at 197. After all radial feed tubes 190, 191, etc., are brazed, the cap 193b is welded in place as illustrated at 198.

Transition from the normal conductor cross-section incorporating internal conduit 185 to the special manifold member 193 takes place just outside the slot as indicated in the enlarged cross-section of FIG. 18. Here the conductor 183 is butt-welded to manifold member 193 and the lower portion of conductor 183 is cut back as shown at 200. A flow transition piece 201 defining a threaded port 202 is welded to manifold member 193 at 203 and to the conductor 183 at 204. This transition piece defines a chamber 205 communicating between internal conduit 185 and manifold reservoir chamber 192. An insulated hose 40 is connected to the threaded port 202 to supply liquid to or to discharge liquid from manifold chamber 205.

It will be appreciated that only the lowermost "half-turn" 182 requires the special manifold member 193 which fits in the bottof of the slot. The remaining half-turns 186, 187, 188 are formed in a C-shape and receive or discharge liquid by means of radial feed tubes 190, 191.

It only remains to note that the ends 180, 181 of the C-shaped "half-turns" are connected with conjugate half-turns by brazing or other suitable means to form full turns connected electrically in series about the pole portion of the rotor with internal conduits 185 communicating for coolant flow.

The slot-center manifolding structure is, of course, not restricted to C-shaped members. For example, the members could be J-shaped with each "half-turn" comprising a straight slot portion and a full end turn portion with the connections made between conjugate "half-turns" near the slots instead of on the pole centerlines.

Operation

The operation of my improved liquid-cooled rotor will now be described. It will be observed that the liquid is fed and discharged radially through the radial feed pipes on the manifold box of the manifold assembly. The manifold box is located at a radially inner location, i.e. in the bottom of the slot or on the spindle. As previously mentioned, the greater the distance of the liquid from the rotor axis, the greater the pressure and the greater the tendency to leak. By using the invention, however, all of the connections made at points outward from the manifold chamber are of metal tubes brazed securely into a corresponding metal conducting member and the metal tube walls are supported by the conductor metal surrounding them. Such a connection has very little tendency to leak, especially if it is held securely in position and not allowed to flex from centrifugal forces or from other forces such as would be caused by thermal contraction and expansion of the windings.

In order to prevent any radial movement of the manifold assemblies, they are securely and rigidly held to the rotor by wedges in a special rotor lug in one case (FIG. 4) and by the normal winding slot wedges in the other case (FIG. 17).

The manifolds are also located axially to prevent the thermal longitudinal movement of the conductors in the winding slots from disturbing the manifold connections. In one case the sides of the rotor lug slots prevent axial movement of the manifold assembly and any longitudinal movement of the windings is absorbed by the flexibility of the connecting end turns. In the other case the location of the manifold connections in the center of the slot allows the windings to expand on either side of the manifold connections.

The use of manifolds located beneath the turns and feeding through radial feed tubes to separate turns allow paralleling the flow through "half-turns" to achieve a minimum pressure difference. Variations of this flow pattern are as described, wherein two or three "half-turns" of the winding can constitute the length of the flow path. The proper correlation of the flow path length with the cross-sectional area of the copper required and with the side of the cooling conduit, in order to establish the best compatability between the electrical requirements and the cooling requirements of the rotor can be ascertained according to the particular conditions by those skilled in the art.

In order to assemble the liquid cooled rotor, the manifold assemblies may be readily made as sub-assemblies and tested before installation in the rotor to insure that they are completely leak-tight. The manifold assemblies may be made by the method and structure outlined in FIGS. 5–7 of the drawings, or by the method and structure outlined in FIGS. 12–13, or as shown in FIGS. 16–18. Other suitable variations will occur to those skilled in the art.

After the manifold assembly is tested it is assembled in the rotor. In the case of end turn manifolds, the ends of the windings are welded to the manifold conducting members. In the case of slot center manifolds, the opposite ends of the C-shaped "half-turns" are welded together to form complete turns. In both cases tubular inserts may be used, as indicated to hold the cooling conduits open as the welding is performed. The winding wedges 54 and the rotor lug wedges 59 are then inserted.

In both basic modifications, hoses 40 are required to connect the manifold chambers to the spindle distribution chambers. Insulated blocking 40a under the end turns will serve to hold hoses 40 down against the spindle in the grooves provided for them as the rotor turns. The retaining ring 28 is then shrunk in position and the leakage distribution ring 29 is subsequently put in position, with its end overhanging the recess 28a in the retaining ring in order to catch any leakage which might occur.

Even though the liquid (de-ionized high purity water here) has a high resistivity, a slight leakage current can flow through the liquid column between points of different potential. If each manifold box were grounded, the leakage currents would represent a shunt resistance across the field winding and the current through each radical feed pipe to ground would vary, depending on the turn voltage above or below ground, and in a + or − direction depending on the location of the turn to which the feed pipe was connected. Since this could cause an electrolytic corrision problem at one end, the coil manifold boxes are insulated in lug slots 45 by ground insulation 61. Thus leakage currents are isolated to that caused by the maximum difference in potential within a single coil. Thus the leakage currents are substantially less and electrolytic corrosion problems are substantially eliminated. By separately insulating the manifold boxes from ground, however, the hoses 40, connecting the manifold boxes to the spindle distribution ring, will have to be insulated. If hoses with metal braid reinforcement are used, insulated ferrules are required to attach the hoses 40 to the manifold boxes. However, by locating the hoses at the spindle diameter, organic insulating material can be used in most cases to construct hoses with sufficient strength to withstand the pressures which are in the neighborhood of 1000 p.s.i. at the spindle diameter. The use of metal braid reinforcement around the outside of the hoses is envisioned in some circumstances, however, and in such cases, the insulated ferrules for joining hoses 40 to the manifold box will be necessary.

The arrangement shown provides great flexibility in selecting the number of half-turns to be cooled by the liquid. Calculations disclose that very small pressure difference is required to provide sufficient liquid coolant flow, far less than the centrifugal fluid pressures in the system. A liquid cooled rotor tends to have appreciably lower $I^2R$ losses than a gas cooled rotor since cooling can be accomplished with much lower total coolant flow passage area and it appears that the arrangement may be used to cool two, three, or even four or more half-turns in series hydraulically without excessive losses or pressure differences. In fact, it appears that erosion problems caused by the velocity of the liquid through the conduits are perhaps the limiting factor in the number of half-turns cooled from inlet to outlet rather than the pressure differential. It can be shown that the velocity of the liquid in the conductor (and therefore the erosion effect) is proportional to the number of half-turns cooled whereas the pressure drop along the flow path increases only as the square root of the number of half-turns cooled. It can be seen from this that the velocity may approach a limiting value before the pressure drop becomes excessive.

Evacuator pump 7 can be used either to evacuate the casing in order to reduce "windage" losses in the air gap, running continuously for this purpose, or it can be operated periodically to lower the casing pressure below the vapor pressure of the liquid at the temperature of the generator, thus removing any coolant which may have escaped due to slow leaks.

If end turn manifolds are used, the lug 43 which holds the manifold assembly supplying the end turns and the slot portions of the windings with liquid undergoes great stresses due to centrifugal force. These are partially relieved by means of the elliptical configuration of retaining ring 28, since centrifugal force causes it to tend to assume a circular shape and thus exert a compressive force radially inwardly on the lugs as the rotor speed increases. If manifolds in the center of the slots are employed, the normal winding slot wedges will hold the coils and manifold against radial displacement.

It will be seen, therefore, that the liquid-cooled rotor described, which incorporates provision for supplying liquid for direct-cooling to the individual turns from manifolds disposed beneath a stack of turns at a relatively low pressure location provides a practical solution to the many problems encountered in liquid-cooled rotors. Since the manifold assemblies are located near the rotor spindle or in the bottom of the slots, rather than at some point outward therefrom, insulating hoses can be used in the neighborhood of the rotor spindle at pressures not exceeding perhaps 1000 p.s.i. The use of such flexible hoses at locations in the rotor at greater radii would be most difficult with materials and hose constructions now commercially available. These hoses can be flexible to absorb thermal movement of the conductors, while the manifold assemblies are so located as to not be subject to stresses tending to cause leaks by reason of such thermal movements.

Applicants' unique manifold assembly and method of assembling the manifold provides a simple arrangement for making the cross connections between radially extending feed tubes and the conductors disposed normal thereto without interfering with liquid flow through the conductor internal conduits. Thus great flexibility in selecting a desired flow pattern for the coolant is achieved.

While there have been described herein two basic modifications and several sub-modifications of the invention, it will be understood that various other changes and substitutions of equivalents may be made. It is, of course, intended to cover in the appended claims all such modifications as fall within the true spirit and scope of the invention.

What we claim as new and desire to secure by Letters Patent of the United States is:

1. In a rotor for a dynamoelectric machine having spindle portions and a central body portion defining a plurality of circumferentially spaced winding slots and including a plurality of serially connected conductors disposed in radially stacked relationship in said winding slots and extending beyond the rotor body as end turns, said conductors defining internal cooling conduits therein, the combination of manifold means defining a liquid coolant reservoir disposed below the radially innermost conductor of a conductor stack, a plurality of radial feed tubes of selected lengths each connecting the manifold reservoir with the internal cooling conduit of one of said conductors, said feed tubes being insulated from, and bypassing the internal cooling conduits of, intervening conductors, and means supplying to and receiving coolant from said manifold means, whereby liquid coolant may be supplied to individual conductor conduits to cool the rotor windings.

2. In a rotor for a dynamoelectric machine having spindle portions and a central body portion defining a plurality of circumferentially spaced winding slots and including a plurality of serially connected conductors disposed in radially stacked relationship in said winding slots and extending beyond the rotor body as end turns, said conductors defining internal cooling conduits therein, the combination of manifold means defining a liquid coolant reservoir disposed beneath the radially innermost conductor of a radial stack of conductors, a plurality of radial feed tubes of selected lengths each connecting the manifold reservoir with one of the respective internal cooling conduits of the overlying conductors at selected radial heights, a plurality of bypass plugs sealed in said intervening conductors and defining bypass conduits connecting the portions of the internal cooling conduit in a given conductor on either side of said bypass plug, said feed tubes being insulated from said intervening conductors and passing through central holes defined by the bypass plugs, whereby coolant may flow from the manifold means in a radial direction to selected conductors.

3. In a rotor for a dynamoelectric machine having spindle portions and a central body portion defining a plurality of circumferentially spaced winding slots and including a plurality of serially connected conductors disposed in radially stacked relationship in said winding slots and extending beyond the rotor body as end turns, said conductors defining internal cooling conduits therein, the combination of manifold means defining a liquid coolant reservoir disposed beneath the radially innermost conductor of a radial stack of conductors, the internal conduits in each conductor of said radial stack above the manifold means comprising at least two spaced longitudinally extending conduits each carrying liquid coolant, a plurality of radial feed tubes of selected lengths connecting the manifold assembly with the coolant conduits of selected conductors, said radial tubes being insulated from the conductors and disposed between the longitudinal coolant conduits of the intervening conductors so as not to intersect therewith, whereby coolant in the reservoir may flow in a radial direction to and from selected conductors.

4. In a rotor for a dynamoelectric machine having spindle portions and a central body portion defining a plurality of circumferentially spaced winding slots and including a plurality of conductors disposed in radially stacked relationship in said winding slots and extending beyond the rotor body as end turns, said conductors defining internal cooling conduits therein, the combination of manifold means defining a liquid coolant reservoir disposed below the radially innermost conductor of a radial stack of conductors, a plurality of radial feed tubes of selected lengths each connecting the manifold reservoir with one of said respective internal conductor cooling conduits, said feed tubes being insulated from and bypassing the internal cooling conduits of intervening conductors, means securing the manifold means and its associated conductor stack against radial displacement with respect to the rotor, said manifold assembly being secured to the rotor spindle between the slot-lying conductors serviced by said manifold means so that longitudinal thermal expansion and contraction of the conductors in the winding slots may take place at either side of the manifold means without imposing excessive stresses on the fluid connections to the manifold.

5. A liquid-cooled rotor for a dynamoelectric machine comprising a rotor having spindle portions and a central body portion defining a plurality of longitudinal circumferentially spaced winding slots, a plurality of conductors defining internal conduits and having portions disposed in said slots in radially stacked relationship and serially connected by conductor portions extending from the slots beyond the rotor body to form radially stacked circumferentially extending end turns, said slot-lying portions and said end turns forming coils about portions of the rotor body, at least one liquid manifold disposed adjacent and below a bottom conductor in each coil, said manifold defining a liquid coolant chamber and including a plurality of radial coolant tubes of different lengths connected to the chamber at their radially innermost ends, each said tube being connected at its radially outermost end to one of said respective conductor coolant conduits for establishing liquid communication between the manifold chamber and the respective conductor conduits, means for supplying to and discharging liquid from said manifold chamber, and means securing the manifold assembly and its associated conductors against radial displacement with respect to the rotor, said manifold assembly being located on the rotor spindle between the slot-lying conductors serviced by said manifold so that longitudinal thermal expansion and contraction of the conductors in the winding slots can take place on either side of the manifold.

6. A liquid-cooled rotor for a dynamoelectric machine comprising a rotor having spindle portions and a central body portion defining a plurality of pairs of circumferentially spaced longitudinal slots, each pair of slots being substantially symmetrically disposed with respect to a rotor pole portion, a plurality of radially stacked conductors forming turns about the rotor pole, each turn having spaced parallel slot-lying portions disposed in a pair of slots and circumferentially extending relatively flexible end turn portions, said conductors defining internal longitudinal coolant conduits, means for supplying and discharging liquid coolant to said internal coolant conduits of selected turns including a liquid manifold box disposed radially inward from the conductor stack substantially midway on the end turns, and a plurality of radial feed tubes of different lengths connected between the manifold box and selected conductors and insulated from intervening conductors, and means securing the manifold box and the center of the end turns both radially and axially with respect to the rotor spindle, whereby the radial feed tube connections are held in place while differential thermal expansion and contraction of the slot-lying portions of the conductors is absorbed by the flexibility of the end turn portions on either side of the manifold.

7. A liquid-cooled rotor for a dynamoelectric machine comprising a rotor having spindle portions and a central body portion defining a plurality of pairs of circumferentially spaced longitudinal slots, each pair of slots being substantially symmetrically disposed with respect to a rotor pole portion, a plurality of radially stacked conductors connected in series to form turns about the rotor pole, each said turn having spaced parallel slot-lying portions disposed in a pair of slots and circumferentially extending end turn portions, said conductors defining internal coolant conduits connected in series about each turn, manifold means rigidly secured to the rotor spindle substantially in axial alignment with the rotor pole and in radial alignment with the circumferentially central portion of each radial stack of end turns, said manifold means defining a liquid chamber adjacent the rotor spindle portion and including a plurality of radial coolant tubes of different lengths, each tube terminating in a selected end turn internal conduit for supplying to and discharging liquid from the manifold chamber to its respective conductor conduit, and means supplying liquid to said manifold means to cool the rotor conductors.

8. The combination according to claim 7 wherein a said manifold means is disposed at either end of the rotor body portion for each pair of slots and where there is one radial tube for each conductor in the end turns, whereby the coolant liquid traverses one complete half-turn between manifold means.

9. The combination according to claim 7 wherein said manifold liquid chamber is divided into first and second portions, and wherein half of the radial feed tubes connect odd end turn conductors with the first chamber while the other half of the radial feed tubes connect even end turn conductors with the second chamber, whereby the coolant liquid traverses one full turn between chambers.

10. The combination according to claim 7 wherein a coolant manifold means is disposed at either end of the rotor for each pair of slots, and wherein a radial tube from the manifold chamber connects with every third end turn conductor conduit, whereby the liquid enters at the manifold on one end of the rotor, traverses one and a half turns, and discharges at the manifold on the other end of the rotor.

11. A liquid-cooled rotor for a dynamoelectric machine comprising a rotor having a central body defining a plurality of longitudinal circumferentially spaced winding slots and a spindle portion having at least two symmetrically disposed radial lugs thereon, said lugs defining axially spaced slots, a plurality of direct-cooled conductors defining first cooling conduits therein disposed in stacked relation in said winding slots and including integral conductor end portions extending circumferentially outside the winding slots terminating adjacent said lug slots, a plurality of liquid manifold assemblies each disposed in a lug slot, each said manifold assembly comprising a plurality of separately insulated radially stacked conducting members electrically connected with the aligned conductor end portions on opposite sides of the rotor lug slots and defining second conduits connecting with said first conduits, a plurality of insulated radial coolant tubes passing through portions of said conducting members and bypassing the second conduits, said tubes being of selected different lengths so as to terminate in different conducting members, third conduits defined by the conducting members, each said third conduit crossconnecting a second conduit in a given conducting member with the end of a radial tube terminating in the same conducting member, a coolant manifold box disposed in the bottom of the lug slot defining a plurality of insulated openings receiving the radially inner ends of the tubes, and means supplying liquid to and receiving liquid from selected manifolds for cooling the rotor conductors.

12. A liquid-cooled rotor for a dynamoelectric machine comprising a rotor having spindle portions and a central body portion defining a plurality of longitudinal circumferentially spaced winding slots, a plurality of conductors disposed in said slots in radially stacked relationship, and serially connected by end turn portions extending beyond the rotor body to form turns about portions of said body, said conductors defining internal coolant conduits, said spindle portion having at least two symmetrically disposed radial lugs thereon, said lugs defining axially spaced slots through which pass the radially stacked end turns of the conductors, a plurality of liquid manifold boxes each disposed in a lug slot and defining a coolant reservoir in the bottom of the lug slot, a plurality of radial coolant tubes of selected lengths individually connected between the coolant reservoir of each manifold box and the internal conduits of the overlying conductor end turns, wedge means securing the manifold boxes and overlying conductor portions in said lug slots, and a retaining ring disposed outside of and holding the end turns in place, said retaining ring contacting said wedges means and being distorted to an elliptical shape with its major axis aligned with said rotor lugs when the rotor is at rest, whereby said retaining ring attempts to assume circular shape as the rotor rotates to exert a compressive force on the rotor lugs and secure the end turns and manifold boxes against radial displacement with respect to the rotor.

13. A liquid-cooled rotor for a dynamoelectric machine comprising a rotor having spindle portions and a central body portion defining a plurality of longitudinal circumferentially spaced winding slots, a plurality of conductors disposed in each of said slots in radially stacked relationship, at least some of said conductors defining longitudinal internal cooling passages, a liquid manifold disposed in the bottom of each slot and defining a liquid coolant chamber, a plurality of radial coolant tubes located substantially at the middle of the length of the slot and connected to communicate with the coolant chamber at their radially innermost ends, said tubes being of different lengths each selected and connected so as to communicate at its radially outermost end with one of said conductor coolant passages, whereby longitudinal thermal expansion and contraction of the conductors in the winding slot can take place on either side of the centrally located radial tubes without imposing substantial stresses on the liquid connections of said tubes, and means securing the manifold assembly and the associated conductor stack against radial displacement in the winding slots.

14. A liquid-cooled rotor for a dynamoelectric machine comprising a rotor having spindle portions and a central body portion defining a plurality of pairs of circumferentially spaced longitudinal slots substantially symmetrically disposed with respect to a rotor pole portion, a first radially stacked group of conductors defining longitudinal internal cooling passages, each conductor having a slot-lying portion and end turn portions projecting from the ends of the slots, a second group of radially stacked conductors defining internal passages and each having a slot-lying portion and projecting end turn portions, the conductors from the first group being disposed symmetrically about the pole with the conductors from the second group in a said pair of slots with the ends of the conductors of the two groups electrically, and the passages therein hydraulically, connected to form a series of turns about the rotor pole, manifold means defining a coolant reservoir chamber disposed at the bottom of each winding slot, a plurality of radial tubes located substantially at the middle of the length of the slot and connected to communicate with the coolant reservoir chamber at their radially innermost ends, said tubes being of different selected lengths and each connected to communicate at its radially outermost end with the conductor coolant passage of one of the conductors, a plurality of flexible hoses connected with the manifold, one hose being adjacent an end of each slot, and liquid distribution chamber means located on the rotor spindle and connected for supplying to and discharging coolant from respective ones of said hoses, whereby longitudinal thermal expansion and contraction of the conductors in the slots can take place on either side of the centrally located radial tubes substantially without stressing the hydraulic connections between said tubes and coolant passages.

15. In a liquid-cooled rotor for a dynamoelectric machine including spindle portions and a central generally cylindrical body portion defining a plurality of pairs of circumferentially spaced longitudinal slots substantially symmetrically disposed with respect to a rotor pole portion, the combination of a plurality of radial stacks of insulated conductors each stack having substantially straight slot-lying portions and circumferentially extending end portions lying outside the slots, the slot-lying conductor portions defining longitudinal internal cooling passages, said conductors being of a developed length substantially equal to the length of a slot plus the circumferential distance between slots, a manifold member disposed adjacent the bottom of the slot-lying portions of each stack of insulated conductors, said manifold member being of a length equal to at least half the length of a rotor slot and defining a plurality of ports located substantially at the center of the length of the slot and opening radially outward, a plurality of insulated tubes each communicating with one of said manifold ports and extending radially through certain of said conductors in a given stack, said tubes being of different lengths and each terminating at and connected to a selected one of the conductors in said stack to communicate with the internal passage of said selected conductor, means defining a bypass passage around each of said tubes in each of said conductors which are disposed radially inward from said selected conductor, each bypass passage communicating between the portions of the internal passage of the conductor disposed at either side of the radial tube, said manifold having a port in at least one end thereof whereby liquid coolant can be supplied to the manifold at the bottom of the slot and distributed through the feed tubes to the respective conductor cooling passages.

16. A liquid-cooled rotor for a dynamoelectric machine comprising a rotor member having spindle portions and a cylindrical central body portion defining a plurality of circumferentially spaced winding slots and including a plurality of serially connected conductors disposed in radially stacked relationship in said winding slots and extending beyond the rotor body as end turns, said conductors defining internal cooling conduits therein, manifold means disposed below the radially innermost conductors of selected conductor stacks defining a liquid coolant reservoir, a plurality of radial feed tubes of selected length each connecting the manifold reservoir with the internal cooling conduit of one of said conductors, means supplying liquid to and receiving coolant from selected manifold means to circulate liquid coolant through the windings, a retaining ring disposed at either end of the rotor body and holding the end turns in place against centrifugal force, and a collecting annulus having a cylindrical portion with a circumferential inwardly directed lip overhanging portions of the retaining ring, whereby any leakage of the cooling liquid draining through the retaining ring is caught by said collecting annulus.

17. The combination according to claim 16 wherein said collecting annulus defines a circumferential wall axially spaced from said overhanging lip within the cylindrical portion to define an annular groove for holding leakage liquid, and a plurality of circumferentially spaced radial separators extending axially between the overhanging lip and the circumferential wall dividing said annular groove into sections, whereby the liquid collected in a section gives an unbalnce to the rotor which is an indication of leakage.

18. A liquid-cooled rotor for a dynamoelectric machine comprising a rotor having spindle portions and a central body portion defining a plurality of longitudinal circumferentially spaced winding slots, a plurality of conductors defining internal conduits and having portions disposed in said slots in radially stacked relationship and serially connected by conductor portions extending from the slots beyond the rotor body to form radially stacked circumferentially extending end turns, said internal condutis of even conductors in the radially stacked slot-lying portions being circumferentially offset from the internal conduits of odd conductors to distribute the conduits within the stack, said slot-lying portions and said end turns forming coils about portions of the rotor body, at least one liquid manifold disposed adjacent and below a bottom conductor in each coil, said manifold defining a liquid coolant chamber and including a plurality of radial coolant tubes of different lengths connected to the chamber at their radially innermost ends, each said tube being connected at its radially outermost end to one of said respective conductor coolant conduits for establishing liquid communication between the manifold chamber and the respective conductor conduits, means for supplying to and discharging liquid from said manifold chamber, and means securing the manifold assembly and its associated conductors against radial displacement with respect to the rotor, said manifold assembly being located on the rotor spindle between the slot-lying conductors serviced by said manifold so that longitudinal thermal expansion and contraction of the conductors in the winding slots can take place on either side of the manifold.

19. A liquid-cooled rotor for a dynamoelectric machine comprising a rotor having spindle portions and a central body portion defining a plurality of pairs of circumferentially spaced longitudinal slots, each pair of slots being substantially symmetrically disposed with respect to a rotor pole portion, a plurality of radially stacked conductors connected in series to form coils about the rotor pole, each said coil having spaced parallel slot-lying portions disposed in a pair of slots and circumferentially extending end turn portions, said conductors defining coolant conduits and inlet means for introducing a liquid thereinto, at least the pole portions of said rotor central body portion being longitudinally extended forming lugs integral with the spindle portion which define axially spaced circumferentially extending slots for holding said circumferentially extending end turn portions of the winding, wedge means disposed in the tops of the lug slots to prevent radial displacement of the end turns from the slots, and means supplying liquid to the end turn inlet means to cool the rotor conductors.

20. A rotor for a dynamoelectric machine having spindle portions and a central body portion defining a plurality of circumferentially spaced winding slots, a plurality of serially connected conductors disposed in radially stacked relationship in said winding slots and extending beyond the rotor body as radially stacked end turns, said conductors defining internal cooling conduits therein, manifold means attached to the rotor spindle at either end of the rotor body and defining liquid coolant reservoirs, a plurality of insulated feed tubes connecting the manifold means at either end of the rotor with the cooling conduit of each of said conductors in the radially stacked end turns, and means recirculating liquid coolant to and from said manifold means, whereby the liquid traverses one complete half turn between manifold means to cool the rotor winding without excessive velocity of the liquid coolant while each tube services a full turn to reduce the number of liquid connections.

21. A rotor for a dynamoelectric machine having spindle portions and a central body portion defining a plurality of circumferentially spaced winding slots, a plurality of serially connected generators disposed in radially stacked relationship in said winding slots and extending beyond the rotor body as radially stacked end turns, said conductors defining internal cooling conduits therein, manifold means secured to the rotor spindle and defining first and second liquid coolant chambers, a plurality of insulated feed tubes, each of half of said insulated feed tubes connecting odd conductors in the radially stacked end turns with the first chamber and each of the remaining half of insulated feed tubes connecting even end turn conductors with the second chamber, and means recirculating liquid coolant between said first and second manifold chambers, whereby the liquid coolant traverses one full turn between first and second chambers to cool the rotor winding without excessive velocity of the liquid coolant while each insulated feed tube servives two full turns to reduce the number of liquid connections.

22. A rotor for a dynamoelectric machine having spindle portions and a central body portion defining a plurality of circumferentially spaced winding slots, a plurality of serially connected generators disposed in radially stacked relationship in said winding slots and extending beyond the rotor body as radially stacked end turns, said conductors defining internal cooling conduits therein, manifold means attached to the rotor spindle at either end of the rotor body and defining liquid coolant reservoirs, a plurality of insulated feed tubes each of which connects a said manifold reservoir with the cooling conduit of every third conductor in the radially stacked end turns, and means recirculating liquid coolant between said manifold means, whereby the liquid from each insulated feed tube traverses one and a half turns to cool the rotor winding without excessive velocity of the liquid coolant while each said tube services three full turns to reduce the number of liquid connections.

References Cited in the file of this patent

UNITED STATES PATENTS

| | | |
|---|---|---|
| 2,786,951 | Morgan | Mar. 26, 1957 |
| 2,898,484 | Krastchew | Aug. 4, 1959 |
| 2,903,609 | Waddington | Sept. 8, 1959 |